(12) United States Patent
Pei et al.

(10) Patent No.: US 10,990,460 B2
(45) Date of Patent: Apr. 27, 2021

(54) METHOD OF GENERATING BROADCAST QUEUE, STORAGE MEDIUM, AND TERMINAL

(71) Applicant: Guangdong OPPO Mobile Telecommunications Corp., Ltd., Guangdong (CN)

(72) Inventors: Runsheng Pei, Guangdong (CN); Liangjing Fu, Guangdong (CN); Ruyu Wu, Guangdong (CN); Zhiyong Lin, Guangdong (CN); Jun Zhang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/565,387

(22) Filed: Sep. 9, 2019

(65) Prior Publication Data
US 2020/0004612 A1   Jan. 2, 2020

Related U.S. Application Data

(63) Continuation of application No. PCT/CN2017/107187, filed on Oct. 21, 2017.

(30) Foreign Application Priority Data

Mar. 10, 2017   (CN) .................. 201710141037.X

(51) Int. Cl.
G06F 9/44   (2018.01)
G06F 9/54   (2006.01)

(52) U.S. Cl.
CPC ............ *G06F 9/546* (2013.01); *G06F 9/542* (2013.01); *G06F 2209/548* (2013.01)

(58) Field of Classification Search
CPC ........................................ G06F 9/546
USPC ........................................ 719/314
See application file for complete search history.

(56) References Cited

U.S. PATENT DOCUMENTS

| | | | |
|---|---|---|---|
| 2004/0076116 A1 | 4/2004 | Hefty et al. | |
| 2005/0078677 A1* | 4/2005 | Benting | H04L 65/4076 370/390 |
| 2010/0262651 A1 | 10/2010 | Nguyen et al. | |

FOREIGN PATENT DOCUMENTS

| | | |
|---|---|---|
| CN | 101023635 A | 8/2007 |
| CN | 103051521 A | 4/2013 |
| CN | 103684808 A | 3/2014 |
| CN | 104063285 A | 9/2014 |
| CN | 104994481 A | 10/2015 |

(Continued)

OTHER PUBLICATIONS

International search report for PCT/CN2017/107187, dated Jan. 19, 2018 (3 pages).

(Continued)

*Primary Examiner* — Timothy A Mudrick

(57) ABSTRACT

Provided are a method of generating a broadcast queue, a storage medium, and a terminal. The method includes determining parameters of broadcast receivers receiving the broadcast message and a broadcast sender, based on the broadcast message; when the parameters of the broadcast sender and the broadcast receivers meet a predefined condition, determining attribute information of the broadcast message; and generating a broadcast queue based on the attribute information.

20 Claims, 4 Drawing Sheets

(56) References Cited

FOREIGN PATENT DOCUMENTS

| | | | |
|---|---|---|---|
| CN | 105204949 | A | 12/2015 |
| CN | 105357648 | A | 2/2016 |
| CN | 105682053 | A | 6/2016 |
| CN | 105897438 | A | 8/2016 |
| CN | 106412091 | A | 2/2017 |
| CN | 106851595 | A | 6/2017 |
| CN | 106878957 | A | 6/2017 |
| WO | 9803033 | A1 | 1/1998 |
| WO | 2005022344 | A2 | 3/2005 |

OTHER PUBLICATIONS

English translation of First office action in a counterpart Chinese patent Application 201710141037.X, dated Nov. 26, 2018 (2 pages).
European search report, EP17899415, dated Jan. 23, 2020 (11 pages).
Indian First Examination Report, Indian application No. 201917039998 dated Feb. 19, 2021 (6 pages).

\* cited by examiner

ND TERMINAL

METHOD OF GENERATING BROADCAST QUEUE, STORAGE MEDIUM, AND TERMINAL

CROSS-REFERENCE TO RELATED APPLICATION(S)

The present application is a continuation of International Patent Application No. PCT/CN2017/107187, filed on Oct. 21, 2017, which claims foreign priority to Chinese Patent Application No. 201710141037.X, filed on Mar. 10, 2017, the entire contents of both of which are hereby incorporated by reference in their entireties.

TECHNICAL FIELD

The present disclosure relates to the field of computer technologies, and in particular to a method of generating a broadcast queue, a storage medium, and a terminal.

BACKGROUND

Broadcast is an information transmission mechanism widely used among applications. As an example of Android system, data transmission and sharing among applications may be performed through broadcasts. Typical examples may be Android inherent texts, phones, and other broadcasts.

In Android system, a broadcast sender may invoke the sendBroadcast function to perform sending of broadcast messages, and a broadcast receiver may invoke the registerReceiver function to perform registration of the broadcast receiver and define broadcast messages of interest, such that desired broadcast messages may be received.

SUMMARY

A first aspect of the present disclosure is to provide a method of generating a broadcast queue, which may include: acquiring at least one broadcast message sent from a broadcast sender; determining at least one of parameters of broadcast receivers receiving the broadcast message, and parameters of the broadcast sender, based on the broadcast message; and determining attribute information of the broadcast message and generating a broadcast queue based on the attribute information to add the broadcast message into the broadcast queue, when at least one of the parameters of the broadcast sender and the parameters of the broadcast receivers meet a predefined condition.

A second aspect of the present disclosure is to provide a storage medium, which may include a plurality of instructions. The instructions may be loaded by a processor to execute to achieve operations of acquiring at least one broadcast message sent by a broadcast sender; determining at least one of parameters of broadcast receivers receiving the broadcast message, and determining parameters of the broadcast sender, based on the broadcast message; and determining attribute information of the broadcast message and generating a broadcast queue based on the attribute information to add the broadcast message into the broadcast queue, when at least one of the parameters of the broadcast sender and the parameters of the broadcast receivers receiving the broadcast message meet a predefined condition.

A third aspect of the present disclosure is to provide a terminal, which may include a processor, a non-transitory memory, and a computer program stored in the non-transitory memory and executed by the processor. The processor may be arranged to execute the computer programs for acquiring at least one broadcast message sent from a broadcast sender; determining at least one of parameters of broadcast receivers receiving the broadcast message, and parameters of the broadcast sender, based on the broadcast message; and determining attribute information of the broadcast message and generating a broadcast queue based on the attribute information to add the broadcast message into the broadcast queue, when at least one of the parameters of the broadcast receivers receiving the broadcast message and the parameters of the broadcast sender meet a predefined condition.

BRIEF DESCRIPTION OF DRAWINGS

By reading detailed description of the following appended figures about non-restrictive embodiments, other features, aims, and advantages of the present disclosure may become more apparent.

DETAILED DESCRIPTION

Figure 1:
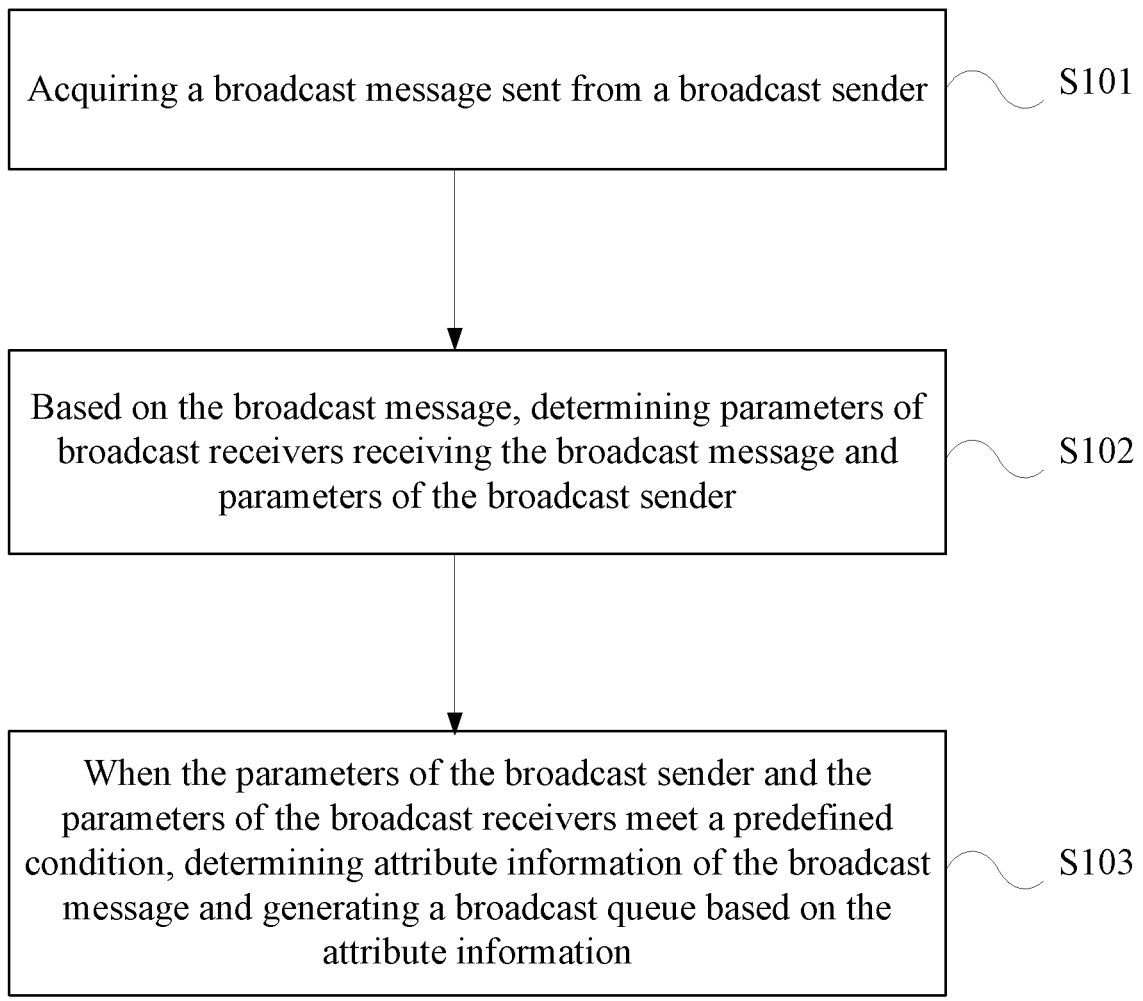
FIG. 1 is a flow chart illustrating a method for generating a broadcast receiver queue provide by an embodiment of the present disclosure.

The present disclosure is to be further described in details by referring to appended figures and embodiments. To be understood that, the embodiments described herein are for the purposes of explaining, but not to limit, the present disclosure. Further to be noted that, for an easy illustration, figures do not show an entire structure, but only a part of the structure that is related to the present disclosure.

Generally, during processing broadcast, a broadcast queue may be generated. A management module may send broadcast messages in the broadcast queue to relative broadcast receivers, such that sending broadcast may be achieved. Current method of generating a broadcast queue may have some drawbacks, for example, all broadcast senders may generate broadcast queues for their broadcast messages that need to be sent, resulting in reduced efficiency in processing the broadcast and increased consumption of system resources and other like problems. Embodiments of the present disclosure may overcome the problems by following manners.

A first aspect of the present disclosure is to provide a method of generating a broadcast queue, which may include: acquiring at least one broadcast message sent from a broadcast sender; determining at least one of parameters of broadcast receivers receiving the broadcast message, and parameters of the broadcast sender, based on the broadcast message; and determining attribute information of the broadcast message and generating a broadcast queue based on the attribute information to add the broadcast message into the broadcast queue, when at least one of the parameters of the broadcast sender and the parameters of the broadcast receivers meet a predefined condition.

In some embodiments, the determining at least one of parameters of the broadcast receivers receiving the broadcast message and the parameters of the broadcast sender, based on the broadcast message, may include determining types of the broadcast receivers receiving the broadcast message and a type of the broadcast sender based on the broadcast message. a statue of at least one of the parameters of the broadcast sender and the parameters of the broadcast receivers receiving the broadcast message meeting the predefined condition, is satisfied by at least one of: the type of the broadcast sender meeting a predefined type; and the type of at least one of the broadcast receivers receiving the broadcast message meeting a predefined type.

In some embodiments, before the determining at least one of types of the broadcast receivers receiving the broadcast message and a type of the broadcast sender based on the broadcast message may further include classifying the broadcast sender and the broadcast receivers by types, and recording a classification result thereof into database.

In some embodiments, the determining parameters of broadcast receivers receiving the broadcast message based on the broadcast message may include determining a number of the broadcast receivers receiving the broadcast message, based on the broadcast message. A statue of the parameters of the broadcast receivers receiving the broadcast message meeting the predefined condition may be satisfied by the number of the broadcast receivers receiving the broadcast message being less than a predefined value.

In some embodiments, the determining parameters of the broadcast sender may include determining a frequency of the broadcast sender sending the at least one broadcast message, wherein the at least one broadcast message are a plurality of broadcast messages. A statue of the parameters of the broadcast sender meeting the predefined condition may be satisfied by the frequency of the broadcast sender sending the plurality of broadcast messages being less than a predefined frequency.

In some embodiments, the determining a frequency of the broadcast sender sending the at least one broadcast messages may include determining a number of times that the broadcast sender sends the plurality of broadcast messages within a predefined period, so as to determine the frequency of the broadcast sender sending the plurality of broadcast messages.

In some embodiments, the method may further include restricting a number of some of the plurality of broadcast messages for being added into the broadcast queue, when determining the frequency of the broadcast sender sending the at least one broadcast message is not less than the predefined frequency.

In some embodiments, the method may further include allowing adding the plurality of broadcast messages into the broadcast queue within a predefined period, when determining the frequency of the broadcast sender sending the at least one broadcast message is less than the predefined frequency.

In some embodiments, the determining the attribute information of the broadcast message and generating the broadcast queue based on the attribute information of the broadcast message may include determining a process of a target broadcast receiver of the broadcast receivers receiving the broadcast message and generating a broadcast queue corresponding to the target broadcast receiver based on the determined process of broadcast receiver.

In some embodiments, the determining a process of a target broadcast receiver of the broadcast receivers receiving the broadcast message and generating a broadcast queue corresponding to the target broadcast receiver based on the determined process of the broadcast receiver may include placing the broadcast message at a head of the broadcast queue corresponding to the target broadcast receiver to generate the broadcast queue when the process of the broadcast receiver is a foreground running process.

A second aspect of the present disclosure is to provide a storage medium, which may include a plurality of instructions. The instructions may be loaded by a processor to execute to achieve operations of acquiring at least one broadcast message sent by a broadcast sender; determining at least one of parameters of broadcast receivers receiving the broadcast message, and determining parameters of the broadcast sender, based on the broadcast message; and determining attribute information of the broadcast message and generating a broadcast queue based on the attribute information to add the broadcast message into the broadcast queue, when at least one of the parameters of the broadcast sender and the parameters of the broadcast receivers receiving the broadcast message meet a predefined condition.

A third aspect of the present disclosure is to provide a terminal, which may include a processor, a non-transitory memory, and a computer program stored in the non-transitory memory and executed by the processor. The processor may be arranged to execute the computer programs for acquiring at least one broadcast message sent from a broadcast sender; determining at least one of parameters of broadcast receivers receiving the broadcast message, and parameters of the broadcast sender, based on the broadcast message; and determining attribute information of the broadcast message and generating a broadcast queue based on the attribute information to add the broadcast message into the broadcast queue, when at least one of the parameters of the broadcast receivers receiving the broadcast message and the parameters of the broadcast sender meet a predefined condition.

In some embodiments, the determining at least one of parameters of broadcast receivers receiving the broadcast message, and parameters of the broadcast sender, based on the broadcast message, comprises determining types of the broadcast receivers receiving the broadcast message, and determining a type of the broadcast sender, based on the broadcast message; and a statue of at least one of the parameters of the broadcast sender and the parameters of the broadcast receivers meeting the predefined condition is satisfied by at least one of: the type of the broadcast sender meeting a predefined type; and the type of at least one of the broadcast receivers receiving the broadcast message meeting a predefined type.

In some embodiments, before determining types of the broadcast receivers receiving the broadcast message, and determining a type of the broadcast sender, based on the broadcast message, the processor may be arranged to classify the broadcast sender and the broadcast receivers by types, and recording a classification result thereof into database.

In some embodiments, the determining the parameters of the broadcast receivers receiving the broadcast message based on the broadcast message may include determining a number of broadcast receivers receiving the broadcast message based on the broadcast message. A statue of the parameters of the broadcast receivers receiving the broadcast message meeting the predefined condition may be satisfied by the number of the broadcast receivers receiving the broadcast message is less than a predefined value.

In some embodiments, the determining the parameters of the broadcast sender may include determining a frequency of the broadcast sender sending the at least one broadcast message, wherein the at least one broadcast message are a plurality of broadcast messages. A statue of the parameters of the broadcast sender meeting the predefined condition may be satisfied by the frequency of the broadcast sender sending the plurality of broadcast messages is less than a predefined frequency.

In some embodiments, the frequency of the broadcast sender sending the plurality of broadcast messages may be determined by a number of times that the broadcast sender sends the plurality of broadcast messages within a predefined period.

In some embodiments, when the predefined condition is not met, the processor may be further arranged to restrict a number of broadcast queues to be generated.

In some embodiments, when the predefined condition is not met, the processor may be further arranged to restrict a number of broadcast messages to be added into the broadcast queue.

In some embodiments, the processor may be further arranged to determine a process of a target broadcast receiver of the broadcast receivers receiving the broadcast message and generating a broadcast queue corresponding to the target broadcast receiver based on the determined process of broadcast receiver.

According to the technical solutions provided by the present disclosure, by acquiring a broadcast message sent from a broadcast sender, and based on the broadcast message, parameters of a broadcast receiver corresponding to the broadcast message and parameters of the broadcast sender may be determined. When the parameters of the broadcast sender and the parameters of the broadcast receiver meet a predefined condition, attribute information of the broadcast message may be determined, and a broadcast queue may be generated based on the attribute information of the broadcast message. In such a way, generation of the broadcast queue may be controlled rationally, vulnerabilities of a system, which may be caused when all the broadcast senders generate their own broadcast queues from the sent broadcast messages for subsequence processing, may be avoided, efficiency of processing broadcast may be improved, consumption of systemic resources may be reduced, and stability of the system may be improved.

FIG. 1 is a flow chart illustrating a method for generating a broadcast queue provided by an embodiment of the present disclosure. The present embodiment may be applicable to control a generation process of a broadcast queue. The method may be performed by a terminal provided by an embodiment of the present disclosure. The terminal may have an apparatus of generating the broadcast queue, wherein the apparatus may be in a form of software or hardware. As shown in FIG. 1, technical solution provided by the present embodiment is to be described hereafter.

S101, a broadcast message sent from a broadcast sender may be acquired.

During processing the broadcast, a service process of the broadcast sender may invoke the sendBroadcast function to send the broadcast message to a management module (such as ActivityManagerService). The management module may place the broadcast message into a broadcast sending queue after receiving the broadcast message. Through a process communication mechanism (such as the Binder process communication mechanism), the management module may then send the broadcast message in the broadcast sending queue to a broadcast receiver, which meet conditions for receiving the broadcast message.

In the broadcast mechanism, broadcast messages may refer to information, which may be transmitted between the system and the applications while the system or the applications are running. To be exemplary, broadcast messages may be a broadcast message indicating system startup, a broadcast message of texts, a broadcast message of a phone call, or broadcast messages of third-party applications or the like. A process of a broadcast sender sending a broadcast message and a process of a broadcast receiver receiving a broadcast message may be performed asynchronously. Through a management module, the broadcast sender and the broadcast receiver may be coupled with each other at a lower degree, which means, after sending the broadcast message, the broadcast sender may not concern about which specific broadcast receiver is to receive the message, and the broadcast receiver may receive the broadcast message of interest without concerning about which specific broadcast sender sending the message.

To be specific, the Counter application may be used as an example, a process of the Counter to send a broadcast message may be shown as the following.

//a broadcast message may be generated
Inent intent=new Intent (BROADCAST_COUNTER_ACTION)
//parameters of the counter and the corresponded count value may be transmitted
intent.putExtra (COUNTER_VALUE, counter);
//the broadcast message may be sent
sendBroadcast (intent)

In some embodiments, when the broadcast sender sends the broadcast message to a management module, the broadcast message may be acquire for subsequent processing.

S102, based on the broadcast message, parameters of broadcast receivers receiving the broadcast message and parameters of the broadcast sender may be determined.

The broadcast sender sending the broadcast message and the broadcast receiver receiving the broadcast message may be asynchronous processes. When the broadcast receiver is receiving the broadcast message, the management module may acquire a registration instruction of the broadcast receiver, wherein the registration instruction of the broadcast receiver may be sent from the broadcast receiver. Usually, the broadcast receiver may register with (subscribe) the management module for desired broadcast messages through the process communication mechanism. The process communication mechanism of the broadcast receiver may perform the broadcast receiver registration in the management module by invoking the registerReceiver function, and at the same time, define the broadcast messages that are of their interest. When the management module sends a broadcast message, which is in a broadcast sending queue, based on the registration of broadcast receivers, the broadcast message may be sent to a message loop queue corresponding to the broadcast receiver that subscribes the message. After receiving the broadcast message, the broadcast receiver may call back a receiving method (such as the onReceive method) from the registered broadcast receiver to execute corresponded functions to process the received broadcast message.

In some embodiments, the registration process of the broadcast receiver receiving a broadcast message (receiving the broadcast message sent by the Counter as described in S101 will be used as an example hereafter) may be expressed as the following.

//A broadcast message of interest will be defined (broadcast message subscription)
IntentFilter counter ActionFilter=
newIntentFilter(CounterService.BROADCAST_COUNTER_ACTION);

```
//Registration of the broadcast receiver may be performed
    registerReceiver(counterActionReceiver,counterAction-
Filter)
```

When the broadcast sender sends the broadcast message {BROADCAST_COUNTER_ACTION} through the management module, as the broadcast receivers may have registered to receive the broadcast message, the broadcast message may be immediately received and processed by a corresponded broadcast receiver. There may be one or a plurality of the broadcast receivers receiving the broadcast message.

In some embodiments, the operation of determining the parameters of the broadcast receiver corresponding to the broadcast message and the parameters of the broadcast sender based on the broadcast message may include determining types of the broadcast receivers receiving the broadcast message and a type of the broadcast sender based on the broadcast message. The type of the broadcast sender and the types of the broadcast receivers may refer to a type of the system, a type of a third party application platform, or an unknown type or the like. In some embodiments, before determining the type of the broadcast sender and the types of the broadcast receivers receiving the broadcast message, the method may further include classifying broadcast senders and broadcast receivers by types, and the classification result may be recorded in the database. After installation of the applications that correspond to the broadcast senders and the broadcast receivers, the classification may be automatically performed accordingly. Alternatively, classification instructions may be received, and the broadcast senders may be classified by types according to the instructions. Alternatively, the automatic classification may be performed to the applications that have already been installed in the system and then recorded into the database as a reference for subsequent comparison.

In some embodiments, the determined parameter of the broadcast receiver may be a number of the broadcast receivers. As described above, a broadcast message may correspond to one or a plurality of broadcast receivers at the same time. A larger number of the broadcast receivers may indicate longer period of time consumed to process the broadcast message and increased consumption of the systemic resources. In another embodiment, the determined parameter of the broadcast receiver may be a number of types of the broadcast receivers. That is to determine the broadcast receiver corresponding to the broadcast message is in one type or in a plurality of types.

S103, when the parameters of the broadcast sender and the parameters of the broadcast receiver meet the predefined condition, attribute information of the broadcast message may be determined, and broadcast queue may be generated based on the attribute information.

In some embodiments, when the determined parameters of the broadcast sender and the broadcast receivers based on the broadcast message are the type of the broadcast sender and the types of the broadcast receivers, and when the type of the broadcast sender meets a predefined type, the attribute information of the broadcast message may be determined, and the broadcast queue may be generated based on the attribute information of the broadcast message. Alternatively, when a type of at least one broadcast receiver meets a predefined type, the attribute information of the broadcast message may be determined, and the broadcast queue may be generated based on the attribute information of the broadcast message. Alternatively, when the type of the broadcast sender and a type of at least one broadcast receiver both meet a predefined type, the attribute information of the broadcast message may be determined, and the broadcast queue may be generated based on the attribute information of the broadcast message. The predefined type may include a type of the system, that is when the broadcast sender and the broadcast receiver are determined to be systemic, the attribute information of the broadcast message may be determined, the broadcast queue may be generated based on the attribute information, and the broadcast message that needs to be sent may be added into the broadcast queue. To be exemplary, when the broadcast sender is a type of a third party application, a predefined condition may not be met, the broadcast message may not be added to a broadcast queue, or the broadcast sender may be prohibited to generate a new broadcast queue. To be specific, the management module may successively send the broadcast messages that are in the generated broadcast queue. Based on the way of sending the broadcast messages, the broadcast message may be defined as a normal broadcast message or an ordered broadcast message. When a normal broadcast message is sent by the management module, the broadcast receivers may receive the broadcast message out of order. When an ordered broadcast message is sent by the management module, the broadcast receivers may receive the broadcast messages in a sequential manner, that is after the first broadcast receiver receives the broadcast message and complete processing the message, the second broadcast receiver may be allowed to start receiving and processing the broadcast message, and so on.

In some embodiments, when the determined parameter of the broadcast corresponding to the broadcast message is a number of the broadcast receivers, and when the number of the broadcast receiver is less than a predefined value, attribute information of the broadcast message may be determined, the broadcast queue may be generated based on the attribute information of the broadcast message, and the broadcast message may be added into the broadcast queue. The predefined value may be any value smaller than 10, 30, or 50. That is when a small number of the broadcast receivers are available, the broadcast queue may be generated based on the attribute information of the broadcast message. For example, when the predefined value is set to be 10, and there may be 8 broadcast receivers subscribed for the same broadcast message, therefore, the number of the broadcast receivers is less than the predefined value, meeting the predefined condition. Then a broadcast queue may be generated based on attribute information of the broadcast message, and the broadcast message may be added into the queue for sending.

In the above embodiment, by determining the type of the broadcast receivers, the type of the broadcast senders, and the number of the broadcast receivers, it may be determined whether to add the broadcast message into a broadcast queue or whether to generate a broadcast queue. To be noted that, conditions of adding a broadcast message into a broadcast queue may not be limited to the type of the broadcast receivers, the number or the type of the broadcast senders. The determination may not be limited to the above description, but may be in a combination of determining various parameters of the broadcast senders and the broadcast receivers.

Through the above method of generating the broadcast queue, a large amount of broadcast messages sent by third party applications may be avoided to be added into the broadcast queue for sending. When a large number of broadcast receivers correspond to a broadcast message, the broadcast message may also be masked for adding into the broadcast queue. In such a way, the mechanism of processing broadcast may be optimized, improving efficiency of processing the broadcast and reducing the consumption of systemic resources.

To be noted that, in some embodiments, in order to control the generation of the broadcast queue, when the broadcast sender sends the broadcast message to the management module, there may be additional conditions for generating a broadcast queue for the broadcast message. The broadcast sender sending the broadcast message and the registration of the broadcast receivers may not be impacted.

According to the technical solutions provided by the present embodiment, by acquiring the broadcast message sent by the broadcast sender, the parameters of the broadcast receiver corresponding to the broadcast message and the parameters of the broadcast sender may be determined based on the broadcast message. When the parameters of the broadcast sender and the parameters of the broadcast receivers meet the predefined condition, the attribute information of the broadcast message may be determined, and the broadcast queue may be generated based on the attribute information. The generation of the broadcast queue may be control properly, vulnerabilities of the system, which may be caused when all the broadcast senders generate their own broadcast queues from the sent broadcast messages for subsequence processing, may be avoided, efficiency of processing the broadcast may be improved, consumption of system resources may be reduced, and stability of the system may be increased.

Figure 2:
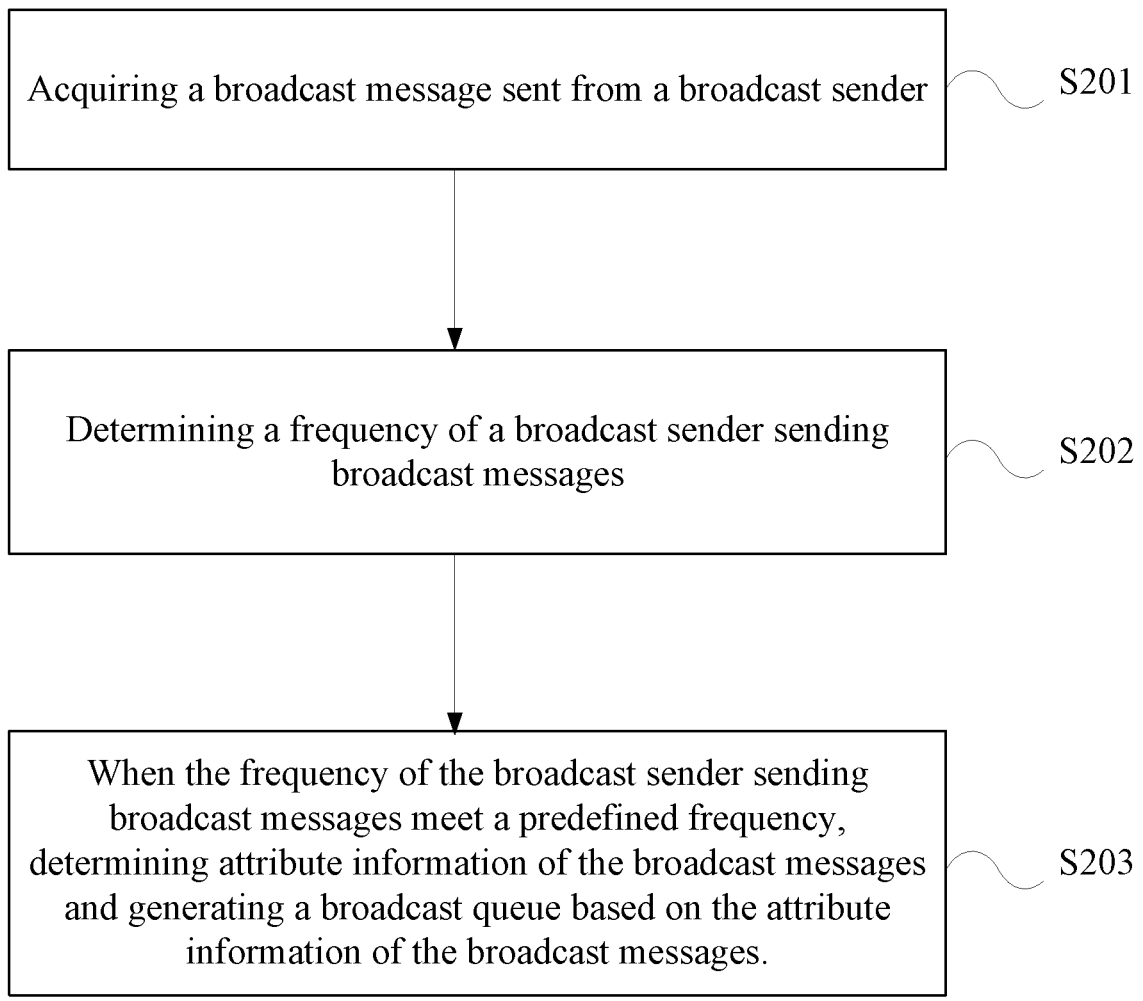
FIG. 2 is a flow chart illustrating another method of generating a broadcast receiver queue provide by an embodiment of the present disclosure.

FIG. 2 is a flow chart illustrating another method of generating the broadcast queue provided by an embodiment of the present disclosure. On the basis of the above embodiment, alternatively, the operation of determining the parameters of the broadcast sender may include determining a frequency of the broadcast sender sending broadcast messages. The predefined condition may be the frequency of the broadcast sender sending the broadcast message less than a predefined frequency. When the frequency of the broadcast sender sending the broadcast messages is not less than the predefined frequency, the number of broadcast messages allowed to be added into the broadcast queue may be under restricted. The broadcast messages sent from the broadcast sender may be a same message or a plurality of different messages.

Based on the above optimization, as shown in FIG. 2, technical solutions provided by the present embodiment may include following operations.

S201, the broadcast message sent by the broadcast sender may be acquired.

S202, the frequency of the broadcast sender sending the broadcast message may be determined.

In some embodiments, a number of times that the broadcast sender sends broadcast messages may be recorded. The determined frequency of the broadcast sender sending broadcast messages may be the number of times of sending broadcast messages within a predefined period of time (such as 30 minutes, 2 hours, or a day). The sent broadcast messages may be a plurality of different messages.

S203, when the frequency of the broadcast sender sending broadcast messages less than the predefined frequency, the attribute information of the broadcast message may be determined, the broadcast queue may be generated based on the attribute information of the broadcast message, and the broadcast messages that need to be sent may be added into the broadcast queue.

During the present operation, according to S202, which may determine whether the frequency of the broadcast sender sending the broadcast messages meets the predefined frequency, the generation of the broadcast queue may be controlled. In some embodiments, when the frequency of the broadcast sender sending broadcast messages is determined to be less than a predefined frequency (for example, less than 20 times/hour), the broadcast queue may be generated based on the attribute information of the broadcast messages, and the broadcast messages that need to be sent may be added into the broadcast queue. To be exemplary, it may also be that, when the determined frequency of the broadcast sender sending broadcast messages reaches the predefined frequency, a number of broadcast queues, which are allowed to be generated by the broadcast sender for the broadcast messages, may be restricted. Alternatively, when the determined frequency of the broadcast sender sending broadcast messages reaches the predefined frequency, the broadcast queue may be allowed to be generated from the broadcast messages within a predefined period of time, but the number of broadcast messages that are allowed to join the broadcast queue may be restricted (for example, only 5-10 broadcast messages may be allowed to join the broadcast queue). Excessive consumption of resources, which is caused by joining a large amount of broadcast messages into the broadcast queue and then subsequently sent to broadcast receivers by the management module, may be avoided. As prohibiting the joining of broadcast messages sent by the broadcast sender into the broadcast queue within the predefined period of time (such as 1 hour), the predefined period of time may be defined and adjusted appropriately based on real-time loading of the system (such as the occupancy of the CPU and memory) and the remaining power of the terminal. For example, when the current loading of the system is at a high level, then broadcast messages sent by the broadcast sender may be prohibited to join into the broadcast queue within 30 minutes.

According to the method of generating the broadcast queue provided by the present embodiment, the broadcast message sent by the broadcast sender may be acquired, the frequency of the broadcast sender sending the broadcast message may be determined based on the broadcast message. When the frequency is less than the predefined frequency, the attribute information of the broadcast message may be determined, and the broadcast queue may be generated based on the attribute information of the broadcast message. By proper monitor and determination of the frequency of the broadcast sender sending broadcast messages, a broadcast queue may not be allowed to generate for the broadcast senders, which send large amount of the broadcast messages at a high frequency. Large consumption of the resources and frequent broadcasting of third party malwares may be avoided, the mechanism of broadcasting may be optimized.

Figure 3:
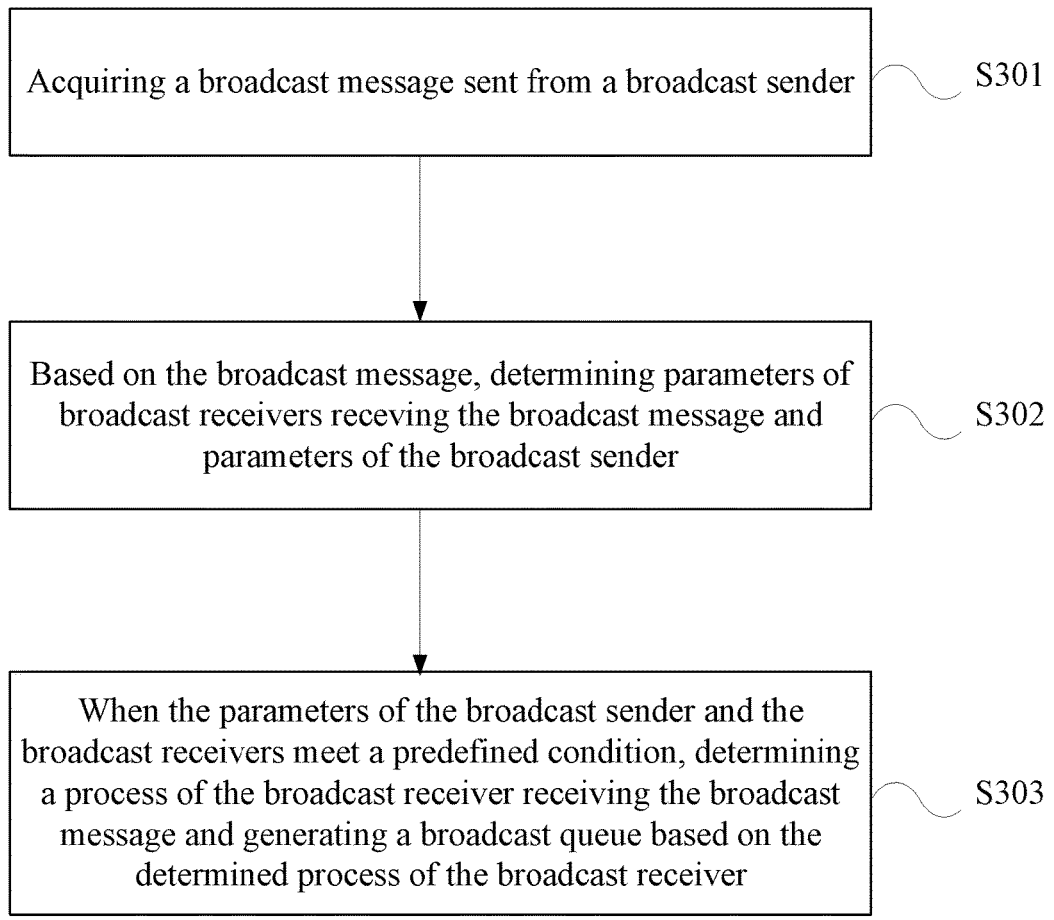
FIG. 3 is a flow chart illustrating still another method of generating a broadcast receiver queue provide by an embodiment of the present disclosure.

FIG. 3 is a flow chart illustrating still another method of generating the broadcast queue provided by an embodiment of the present disclosure. On the basis of the above embodiment, alternatively, the operation of determining the attribute information of the broadcast message and generating the broadcast queue based on the attribute information of the broadcast message may include determining a process of the broadcast receiver receiving the broadcast message and generating the broadcast queue based on the determined process of the broadcast receiver.

On the basis of the above optimization, as shown in FIG. 3, technical solutions of the present embodiment may include following operations.

S301, the broadcast message sent by the broadcast sender may be acquired.

S302, based on the broadcast message, the parameters of the broadcast receivers receiving the broadcast message and the parameters of the broadcast sender may be determined.

S303, when the parameters of the broadcast sender and the parameters of the broadcast receivers meet the predefined condition, the process of the broadcast receiver of the broadcast message may be determined, the broadcast queue may be generated based on the determined process of the broadcast receiver, and the broadcast messages that need to be sent may be added into the broadcast queue.

The attribute information of the broadcast message may be instructive information contained by the broadcast message or related information of the broadcast sender and the broadcast receiver that are relative to the broadcast message. In some embodiments, the generation of the broadcast queue based on the attribute information of the broadcast message may refer to the generation of the broadcast queue according to a time order of which the broadcast messages are sent by the broadcast sender.

In another embodiment, the attribute information of the broadcast message may be the process information of the broadcast receiver receiving the broadcast message. In some embodiments, a way of generating the broadcast queue based on the attribute information of the broadcast message may be determining a position of the broadcast message in the broadcast queue based on the process of the broadcast receiver and placing the broadcast message into a corresponded position. To be exemplary, when a running process of a broadcast receiver of the broadcast message is determined to include a foreground running process, the broadcast message may be arranged at the head of the broadcast queue during the generation, such that the broadcast receiver with the foreground running process may receive the broadcast message at the earliest time and process the message. To be noted that, in other embodiments, the way of generating the broadcast queue based on the attribute information of the broadcast message may not be limited to the process of the broadcast receiver, but may also include determining the order of the broadcast messages in the broadcast queue based on the type of the broadcast receiver (whether it is a systemic application) to generate the broadcast queue.

According to the method of generating the broadcast queue provided by the present embodiment, the broadcast message sent by the broadcast sender may be acquired, the parameters of the broadcast receivers receiving the broadcast message and the parameters of the broadcast sender may be determined based on the broadcast message. When the parameters of the broadcast sender and the parameters of the broadcast receivers meet the predefined condition, the processes of the broadcast receivers of the broadcast message may be determined, the broadcast queue may be generated based on the process of the broadcast receiver, and the broadcast messages that need to be sent may be added into the queue. The broadcast queue may be generated flexibly, based on running situations of various broadcast receiver processes, a sequence of sending the broadcast messages may be controlled, and the mechanism of broadcasting may be further optimized, improving efficiency of broadcasting.

Figure 4:
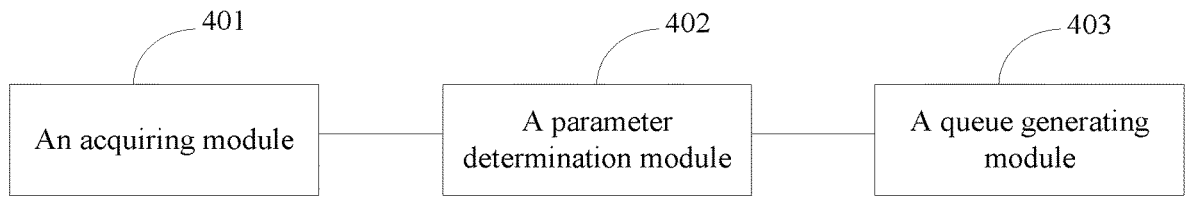
FIG. 4 is a structural diagram of an apparatus of generating a broadcast queue provide by an embodiment of the present disclosure.

FIG. 4 is a structural diagram of an apparatus of generating the broadcast queue provided by an embodiment of the present disclosure. The apparatus may be used to execute the method of generating the broadcast queue as described above, may contain corresponded functional modules to execute the method, and may achieve the beneficial effects. As shown in FIG. 4, the apparatus may include an acquisition module 401, a parameter determination module 402, a queue generating module 403.

The acquisition module 401 may be used to acquire the broadcast message sent by the broadcast sender.

The parameter determination module 402 may be used to determine the parameters of the broadcast receivers receiving the broadcast message and the parameters of the broadcast sender.

The queue generating module 403 may be used to determine attribute information of the broadcast message when the parameters of the broadcast sender and the parameters of the broadcast receivers meet the predefined condition, and generate the broadcast queue based on the attribute information of the broadcast message.

Technical solutions provided by the present embodiment may overcome defects of current method of generating a broadcast queue. The efficiency of processing the broadcast may be improved, the consumption of systemic resources may be reduced, and the stability of the system may be improved.

Alternatively, the parameter determination module 402 may be used to determine the types of the broadcast receivers receiving the broadcast message and the type of the broadcast sender. The queue generating module 403 may be used to determine attribute information of the broadcast message when a type of at least one broadcast receiver and the type of the broadcast receiver meet the predefined type, generate the broadcast queue based on the attribute information of the broadcast message, and add the broadcast messages that need to be sent into the broadcast queue.

Alternatively, the parameter determination module 402 may be used to determine the number of the broadcast receivers receiving the broadcast message based on the broadcast message. The queue generating module 403 may be used to determine the attribute information of the broadcast message when the number of the broadcast receivers meet the predefined value, and generate the broadcast queue based on the attribute information of the broadcast message.

Alternatively, the parameter determination module 402 may be used to determine the frequency of the broadcast sender sending the broadcast messages. The queue generating module 403 may be used to determine the attribute information of the broadcast message when the frequency of the broadcast sender sending the broadcast messages is less than a predefined frequency, generate the broadcast queue based on the attribute information of the broadcast message, and add the broadcast messages that need to be sent into the queue.

Alternatively, the parameter determination module 402 may be used to determine the processes of the broadcast receivers of the broadcast message. The queue generating module 403 may be used to determine the attribute information of the broadcast message when the processes of the broadcast receivers meet a predefined process, generate the broadcast queue based on the determined process of the broadcast receiver, and add the broadcast messages that need to be sent to the broadcast queue.

Figure 5:
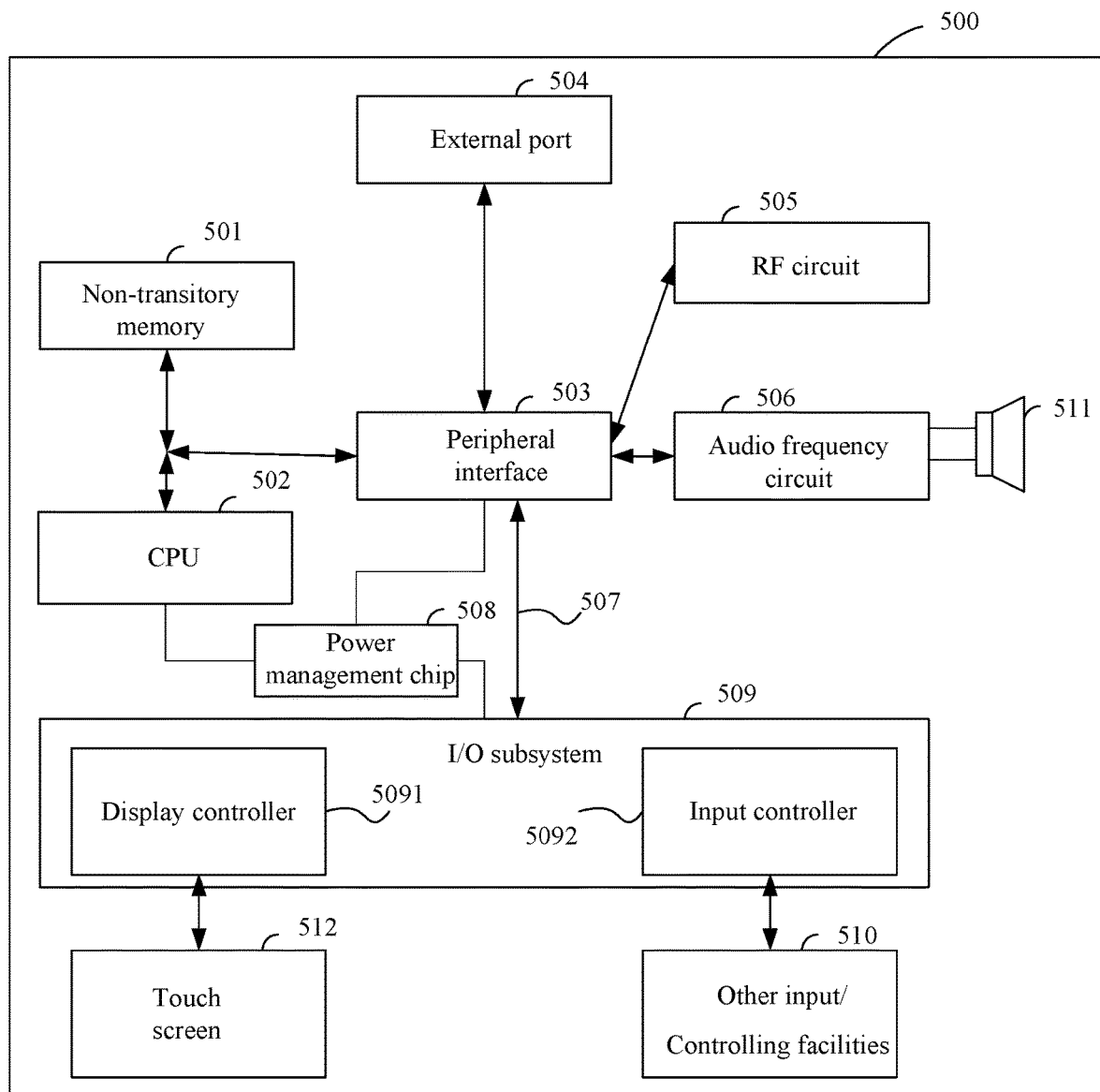
FIG. 5 is a structural diagram of a terminal provide by an embodiment of the present disclosure.

On the basis of all the above embodiments, the present embodiment may provide a terminal, which may include the apparatus of generating the broadcast queue. FIG. 5 is a structural diagram of a terminal provided by an embodiment of the present disclosure. As shown in FIG. 5, the terminal may include a non-transitory memory 501, a central processing unit (CPU) 502, a peripheral interface 503, a radio frequency (RF) circuit 505, an audio frequency circuit 506, a loud speaker 511, a power management chip 508, an input/output (I/O) subsystem 509, a touch screen 512, other input/controlling devices 510, and external ports 504, all of which may communicate through one or more communication buses or signal lines 507.

It should be understood that, the terminal 500 shown in the figure is only an example and may include more or less elements than what are shown in the figure. Two or more of the elements may be combined, or various configurations of the elements may be included. The elements shown in the figure may be in a form of hardware, software or a combination of the hardware and software, which may include one or more signal processors and application specific integrated circuits.

The terminal, which may be used to manage authorities of multiple instances of applications, will be described in details hereafter. A smart phone will be used as an example of the terminal.

The non-transitory memory 501 may be accessed by the CPU 502, the peripheral interface 503, and the like. The non-transitory memory 501 may include a high-speed random access memory or a nonvolatile memory, for example one or more of disk storage devices, flash memory devices, or other volatile solid state memory devices.

The peripheral 503 may connect the input and output peripherally to the CPU 502 and the non-transitory 501.

The I/O subsystem 509 may configure the input and output to the peripheral. For example, the touch screen 512 and other input/controlling devices 510 may be connected to the peripheral interface 503. The I/O subsystem 509 may include a display controller 5091 and one or more input controllers 5092 to control other input/controlling device 510. The one or more input controllers 5092 may receive electrical signals from other input/controlling devices 510 or send electrical signals to the other input/controlling devices 510. The other input/controlling devices 510 may include physical buttons (pressing buttons, rocker buttons, and the like), dial disks, slide switches, joysticks, and clicking wheels. To be noted that, the input controllers 5092 may be connected to any one of the following devices: a keyboard, an infrared port, a USB port, and a pointing device such as a mouse.

The touch screen 512 may be an interface for input and output between the user terminal the user. Visual output may be displayed to the user, wherein the visual output may include graphs, texts, icons, videos and the like.

The display controller 5091 in the I/O subsystem 509 may receive electric signals from the touch screen 512 or send electric signals to the touch screen 512. The touch screen 512 may detect touches on the touch screen, and the display controller 5091 may transmit the detected touches into an interaction with a user interface object, displayed on the touch screen 512, such that a human-device interaction may be achieved. The user interface object displayed on the touch screen 512 may be an icon to operate a game, an icon to connect to a network, and the like. To be noted that, the device may further include an optical mouse, wherein the optical mouse may be a touch-sensitive surface without displaying visual outputs or an extension of a touch-sensitive surface formed from the touch screen.

The RF circuit 505 may be mainly used to generate communication between the mobile phone and a wireless network (that is a network side), such that data receipt and sending may be performed between the mobile phone and the wireless network, such as receiving and sending messages, emails, and the like. To be specific, the RF circuit 505 may receive and send RF signals, which are also called electromagnetic signals. The RF circuit 505 may transmit the electric signals into the electromagnetic signals or transmit the electromagnetic signals into the electric signals, and communicate with communicational networks other devices through the electromagnetic signals. The RF circuit 505 may include a known circuit, which may be used to execute the above-mentioned functions, including but not limited to an antenna system, an RF transceiver, one or more amplifiers, a network coordinator, one or more oscillators, a digital signal processor, a coder-decoder (CODEC), a chipset, a subscriber identity module (SIM), and the like.

The audio frequency circuit 506 may be used to receive audio data from the peripheral interface 503, transmit the audio data into electric signals, and send the electric signals to the loud speaker 511.

The loud speaker 511 may be used for the mobile phone to receive voice signals from the wireless network through the RF circuit 505, the voice signals may be restored into voice to be played to the user.

The power management chip 508 may be used to supply power to and manage power of hardware, which is connected to the CPU 502, I/O subsystem, and the peripheral interface.

The CPU 502 provided by the present embodiment may perform following operations.

A broadcast message sent by a broadcast sender may be acquired.

Based on the broadcast message, parameters of broadcast receivers receiving the broadcast message and parameters of the broadcast sender may be determined.

When the parameters of the broadcast sender and the parameters of the broadcast receivers meet a predefined condition, attribute information of the broadcast message may be determined, a broadcast queue may be generated based on the broadcast message, and the broadcast message that needs to be sent may be added into the broadcast queue.

Alternatively, the operation of determining the parameters of the broadcast receivers receiving the broadcast message and the parameters of the broadcast sender based on the broadcast message may include a following operation.

Based on the broadcast message, types of the broadcast receivers receiving the broadcast message and a type of the broadcast sender may be determined.

The parameters of the broadcast sender and the parameters of the broadcast receivers meeting the predefined condition may include:

The type of the broadcast sender and a type of at least one broadcast receiver meeting a predefined type.

Alternatively, the operation of determining the parameters of the broadcast receiver corresponding to the broadcast message based on the broadcast message may include a following operation.

A number of the broadcast receivers receiving the broadcast message may be determined based on the broadcast message.

The parameters of the broadcast receiver meeting the predefined condition may include the number of the broadcast receivers meeting a predefined value.

Alternatively, determining the parameters of the broadcast sender may include a following operation.

A frequency of the broadcast sender sending the broadcast message may be determined.

The parameters of the broadcast sender meeting the predefined condition may include the frequency of the broadcast sender sending the broadcast message being less than a predefined frequency.

Alternatively, the operation of determining the attribute information of the broadcast message and generating the broadcast queue based on the attribute information of the broadcast message may include a following operation.

A process of the broadcast receiver of the broadcast message may be determined and the broadcast queue may be generated based on the determined process of the broadcast receiver.

To be noted that, the above description is only about preferred embodiments of the present disclosure and implemented technical principles. Skilled in the art should understand that the present disclosure should not be limited to the specific embodiments described herein. Skilled in the art shall be able to perform any obvious modifications, re-adjustment and replacement to the embodiments without departing from the scope of the present disclosure. Therefore, although the present disclosure may be described in details through the above-mentioned embodiments, the present disclosure should not be limited to the above-mentioned embodiments. Without departing from the concepts of the present disclosure, may other equivalent embodiment may also be included, and the scope of the present disclosure is defined by the claims.

What is claimed is:

1. A method of generating a broadcast queue, comprising:
   acquiring at least one broadcast message sent from a broadcast sender;
   determining at least one of parameters of broadcast receivers receiving the broadcast message, and parameters of the broadcast sender, based on the broadcast message;
   determining attribute information of the broadcast message and generating a broadcast queue based on the attribute information to add the broadcast message into the broadcast queue, when at least one of the parameters of the broadcast sender and the parameters of the broadcast receivers meet a predefined condition; and
   prohibiting the message from being added into an existing broadcast queue, or prohibiting the broadcast sender from generating the broadcast queue, when the at least one of the parameters of the broadcast sender and the parameters of the broadcast receivers do not meet the predefined condition.

2. The method according to claim 1, wherein determining the at least one of parameters of broadcast receivers receiving the broadcast message, and the parameters of the broadcast sender based on the broadcast message, comprises:
   determining types of the broadcast receivers receiving the broadcast message and a type of the broadcast sender based on the broadcast message; and
   the at least one of the parameters of the broadcast sender and the parameters of the broadcast receivers receiving the broadcast message meeting the predefined condition comprises at least one of:
     the type of the broadcast sender meeting a predefined type; and
     the type of at least one of the broadcast receivers receiving the broadcast message meeting a predefined type.

3. The method according to claim 2, further comprising:
   before the determining at least one of types of the broadcast receivers receiving the broadcast message and a type of the broadcast sender based on the broadcast message,
   classifying the broadcast sender and the broadcast receivers by types, and recording a classification result thereof into database.

4. The method according to claim 1, wherein determining the at least one of parameters of broadcast receivers receiving the broadcast message, based on the broadcast message, comprises:
   determining a number of the broadcast receivers receiving the broadcast message, based on the broadcast message; and
   the parameters of the broadcast receivers receiving the broadcast message meeting the predefined condition comprises the number of the broadcast receivers receiving the broadcast message being less than a predefined value.

5. The method according to claim 1, wherein determining parameters of the broadcast sender comprises:
   determining a frequency of the broadcast sender sending the at least one broadcast message, wherein the at least one broadcast message is a plurality of broadcast messages; and
   the parameters of the broadcast sender meeting the predefined condition comprises the frequency of the broadcast sender sending the plurality of broadcast messages being less than a predefined frequency.

6. The method according to claim 5, wherein determining the frequency of the broadcast sender sending the at least one broadcast message, comprises:
   determining a number of times that the broadcast sender sends the plurality of broadcast messages within a predefined period, so as to determine the frequency of the broadcast sender sending the plurality of broadcast messages.

7. The method according to claim 5, wherein the method further comprises:
   restricting a number of some of the plurality of broadcast messages for being added into the broadcast queue, when determining the frequency of the broadcast sender sending the at least one broadcast message is not less than the predefined frequency.

8. The method according to claim 5, wherein the method further comprises:
   allowing adding the plurality of broadcast messages into the broadcast queue within a predefined period, when determining the frequency of the broadcast sender sending the at least one broadcast message is less than the predefined frequency.

9. The method according to claim 1, wherein determining the attribute information of the broadcast message and generating the broadcast queue based on the attribute information to add the broadcast message into the broadcast queue comprises:
   determining a process of a target broadcast receiver of the broadcast receivers receiving the broadcast message and generating a broadcast queue corresponding to the target broadcast receiver based on the determined process of broadcast receiver.

10. The method according to claim 9, wherein determining the process of the target broadcast receiver of the broadcast receivers receiving the broadcast message and generating the broadcast queue corresponding to the target broadcast receiver based on the determined process of broadcast receiver comprises:
    placing the broadcast message at a head of the broadcast queue corresponding to the target broadcast receiver to generate the broadcast queue when the process of the broadcast receiver is a foreground running process.

11. A non-transitory storage medium, comprising a plurality of instructions, which are loaded by a processor to execute to achieve operations of:

acquiring at least one broadcast message sent by a broadcast sender;

determining at least one of parameters of broadcast receivers receiving the broadcast message, and determining parameters of the broadcast sender, based on the broadcast message;

determining attribute information of the broadcast message and generating a broadcast queue based on the attribute information to add the broadcast message into the broadcast queue, when at least one of the parameters of the broadcast sender and the parameters of the broadcast receivers receiving the broadcast message meet a predefined condition; and prohibiting the message from being added into an existing broadcast queue, or prohibiting the broadcast sender from generating the broadcast queue, when the at least one of the parameters of the broadcast sender and the parameters of the broadcast receivers does not meet the predefined condition.

12. A terminal, comprising a processor, a non-transitory memory, and a computer program stored in the non-transitory memory and executed by the processor, wherein the processor is arranged to execute the computer programs for:

acquiring at least one broadcast message sent from a broadcast sender;

determining at least one of parameters of broadcast receivers receiving the broadcast message, and parameters of the broadcast sender, based on the broadcast message;

determining attribute information of the broadcast message and generating a broadcast queue based on the attribute information to add the broadcast message into the broadcast queue, when at least one of the parameters of the broadcast receivers receiving the broadcast message and the parameters of the broadcast sender meet a predefined condition; and prohibiting the message from being added into an existing broadcast queue, or prohibiting the broadcast sender from generating the broadcast queue, when the at least one of the parameters of the broadcast sender and the parameters of the broadcast receivers does not meet the predefined condition.

13. The terminal according to claim 12, wherein determining the at least one of parameters of broadcast receivers receiving the broadcast message, and the parameters of the broadcast sender, based on the broadcast message, comprises:

determining types of the broadcast receivers receiving the broadcast message, and determining a type of the broadcast sender, based on the broadcast message; and the at least one of the parameters of the broadcast sender and the parameters of the broadcast receivers meeting the predefined condition comprises at least one of:

the type of the broadcast sender meeting a predefined type; and the type of at least one of the broadcast receivers receiving the broadcast message meeting a predefined type.

14. The terminal according to claim 13, wherein, before determining types of the broadcast receivers receiving the broadcast message, and determining a type of the broadcast sender, based on the broadcast message, the processor is arranged to classify the broadcast sender and the broadcast receivers by types, and recording a classification result thereof into database.

15. The terminal according to claim 12, wherein determining the parameters of the broadcast receivers receiving the broadcast message based on the broadcast message comprises:

determining a number of broadcast receivers receiving the broadcast message based on the broadcast message; and the parameters of the broadcast receivers receiving the broadcast message meeting the predefined condition comprises the number of the broadcast receivers receiving the broadcast message is less than a predefined value.

16. The terminal according to claim 12, wherein determining the parameters of the broadcast sender comprises:

determining a frequency of the broadcast sender sending the at least one broadcast message, wherein the at least one broadcast message is a plurality of broadcast messages; and the parameters of the broadcast sender meeting the predefined condition comprises the frequency of the broadcast sender sending the plurality of broadcast messages is less than a predefined frequency.

17. The terminal according to claim 16, wherein the frequency of the broadcast sender sending the plurality of broadcast messages is determined by a number of times that the broadcast sender sends the plurality of broadcast messages within a predefined period.

18. The terminal according to claim 12, wherein, when the predefined condition is not met, the processor is further arranged to restrict a number of broadcast queues to be generated.

19. The terminal according to claim 12, wherein, when the predefined condition is not met, the processor is further arranged to restrict a number of broadcast messages to be added into the broadcast queue.

20. The terminal according to claim 12, wherein the processor is further arranged to determine a process of a target broadcast receiver of the broadcast receivers receiving the broadcast message and generating a broadcast queue corresponding to the target broadcast receiver based on the determined process of broadcast receiver.

* * * * *